Oct. 30, 1951 P. TERRANOVA 2,573,510
SHOCK ABSORBING VEHICLE BUMPER
Filed Jan. 19, 1946 2 SHEETS—SHEET 1
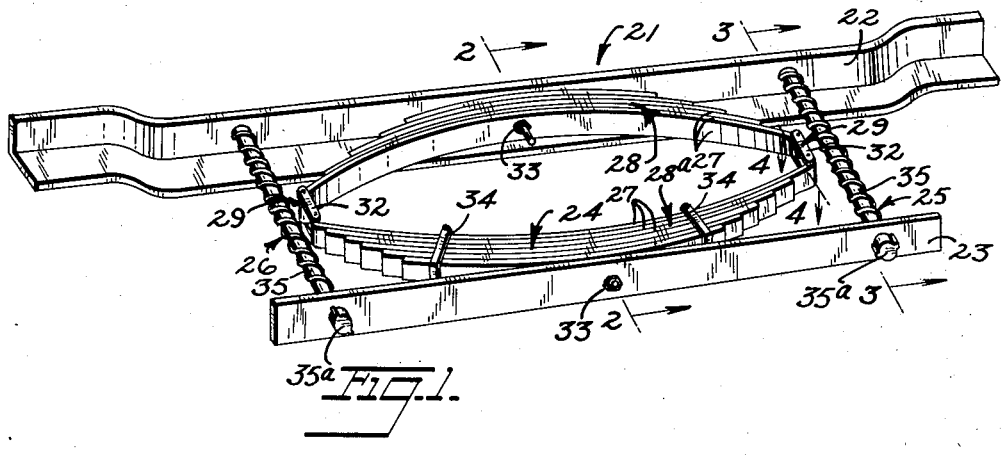
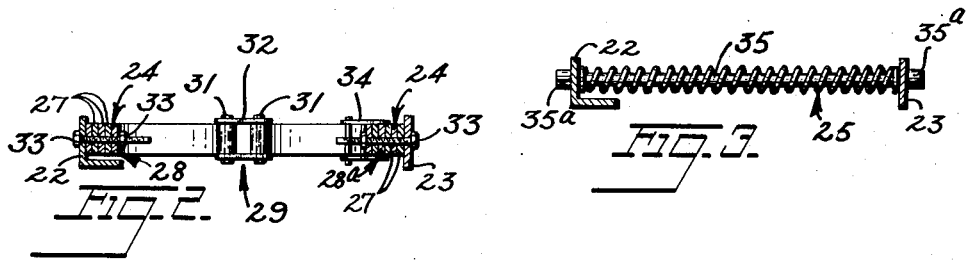
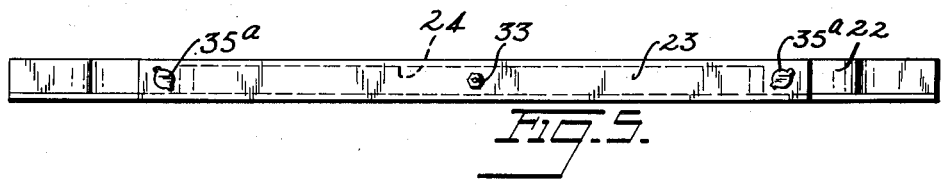
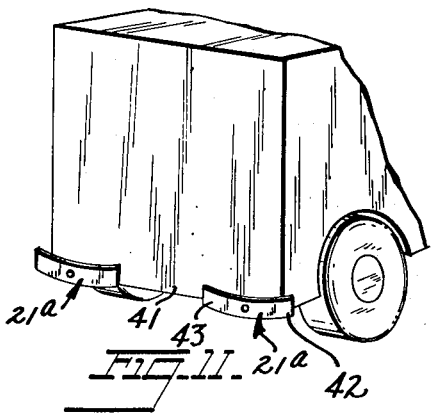
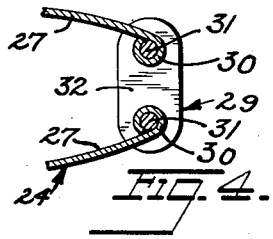
INVENTOR.
PASQUALE TERRANOVA
BY
ATTORNEY Oct. 30, 1951     P. TERRANOVA     2,573,510
SHOCK ABSORBING VEHICLE BUMPER
Filed Jan. 19, 1946     2 SHEETS—SHEET 2
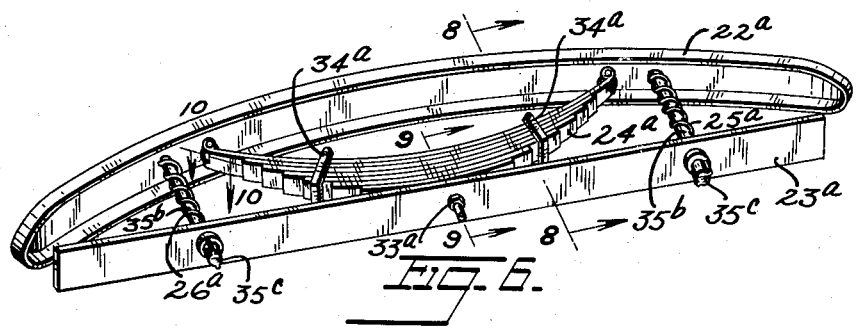
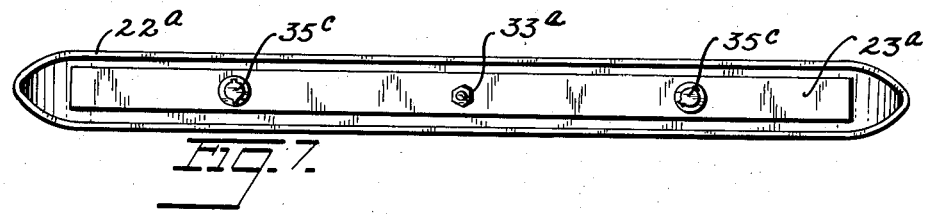
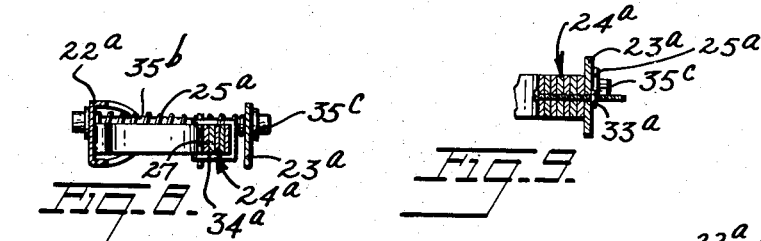
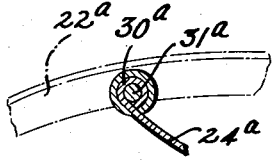
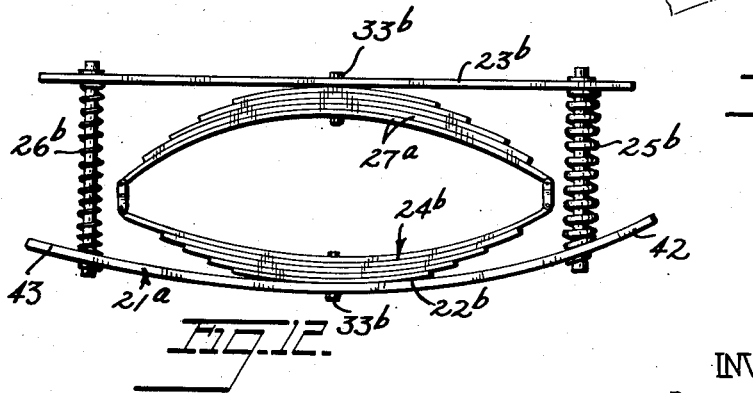
INVENTOR
PASQUALE TERRANOVA Patented Oct. 30, 1951

2,573,510

UNITED STATES PATENT OFFICE 2,573,510

SHOCK ABSORBING VEHICLE BUMPER

Pasquale Terranova, Bronx, N. Y.

Application January 19, 1946, Serial No. 642,189

1 Claim. (Cl. 293—85)

This invention relates in general to a shock absorbing bumper for all types of vehicles, both passenger cars and trucks, and both heavy and light vehicles of each type.

It is an object of this invention to provide a heavy duty shock absorbing bumper which is adapted to be used on all types of vehicles, to protect the vehicles from damage by collision.

It is another object of this invention to provide a strong heavy duty type shock absorbing bumper.

It is a further object of this invention to provide a strong heavy duty shock absorbing bumper comprising a sturdy bumper member strongly connected and mounted to the vehicle.

A still further object of this invention is to provide a heavy duty bumper which will absorb the shock when striking an object in order to protect the object which is struck.

Additional objects of this invention as well as its construction, use and operation will in part be obvious and will in part become apparent from the following disclosure.

For further comprehension of the invention, and of the objects and advantages thereof, reference will be had to the following description and accompanying drawings, and to the appended claim in which the various novel features of the invention are more particularly set forth.

In the accompanying drawing forming a material part of this disclosure:

Fig. 1 is a perspective view of the bumper according to one form of the invention.

Fig. 2 is a cross section of the article shown in Fig. 1 taken along the line 2—2.

Fig. 3 is a cross section of the article shown in Fig. 1 taken along the line 3—3.

Fig. 4 is a fragmentary plan view in cross section of the article shown in Fig. 1 taken along the line 4—4.

Fig. 5 is a rear elevation of the article shown in Fig. 1.

Fig. 6 is a perspective view of a bumper according to another form of this invention.

Fig. 7 is a rear elevational view of the article shown in Fig. 6.

Fig. 8 is a side cross sectional view of the article shown in Fig. 6 taken along the line 8—8.

Fig. 9 is a fragmentary side cross sectional view of the article shown in Fig. 6 taken along the line 9—9.

Fig. 10 is a fragmentary plan view in cross section of a portion of the article shown in Fig. 8 taken along the line 10—10.

Fig. 11 is a fragmentary schematic view of the rear end of a heavy vehicle showing positioned thereon two bumpers according to another form of this invention.

Fig. 12 is a top plan view of a bumper according to Fig. 11.

In the first form of the invention illustrated in Figs. 1 to 5, there is shown a bumper generally designated 21 comprising a bumper member 22 and a mounting member 23 springably connected together by means of a leaf spring generally designated 24 and a pair of coil spring connectors 25 and 26.

The bumper member 22 is generally a heavy, tough, elongated body, such as, a long strip of heavy steel, which is adapted to receive and distribute a heavy shock. This bumper member 22 may in general be a conventional vehicle bumper and the structure thereof may be varied within a limit conventionally used in automobile and truck construction. In general, the bumper will be long enough to extend across the width of the truck on which it is mounted and will have weight and strength in proportion to the size and weight of the vehicle.

The mounting member 23 is a somewhat smaller and lighter elongated member, such as a steel member, which is rigidly mounted on the truck and which forms the connection between the bumper and the truck. The structure and mounting of this member will be obvious to those skilled in the art.

The leaf spring 24 serves to interconnect the bumper member 22 and the mounting member 23, and to springably separate these members one from the other. The structure of this leaf spring and its mounting on these members is shown in greater detail in Fig. 2. The leaf spring comprises a plurality of heavy spring steel members or leaves 27 arranged in groups 28 and 28ª in an arcuate arrangement as is conventional in springs of this type. Each group comprises a set of these members 27 joined together to cooperate as one integral spring member. These groups 28 and 28ª are connected together at their ends as shown in Fig. 4 by means of a conventional shackling connection 29 whereby the longest member of one spring group is joined to the similar member of the other group. The connection 29, comprises a loop 30 on the end of the spring member 27, the loop passing around a bolt 31 or the like secured to spaced bolt plates 32.

One group 28 of spring members 27 is connected to the bumper member 22, by means of bolt 33 or the like. The other group 28ª is connected to the mounting member 23 similarly by another bolt 33. Optionally either or both of these groups 28 and 28a may have their spring members 27 connected together by means of conventional clamps 34.

By means of this spring mounting, bumper member 22 is movably connected to mounting member 23 so that a force of a blow on the bumper member 22 is transmitted through springs 24 to the mounting member 23. In this way a shock applied to the bumper member is absorbed by the springs 24 instead of being transmitted directly to the mounting member 23 and thereby to the truck itself.

Additionally another pair of springs 25 and 26 interconnect the bumper member 22 with the mounting member 23. As shown in greater detail in Fig. 3, the bumper member 22 and the mounting member 23 are slidably interconnected by means of a rod 35 which has caps 35a on either end thereof to prevent it from being disengaged from members 22 and 23 and to limit the separation between these members, with spring 25 spirally passing around this rod. When a shock is applied to bumper member 22 forcing it toward mounting member 23, part of this shock is also taken up by spring 25 with rod 35 adapted to be forced through member 23 to extend back therefrom. A similar spring attachment interconnects the mounting member and bumper member at either end thereof.

The secondary mounting through springs 25 and 26 serves to assist in taking up a shock of a collision and optionally serves to help maintain a nearly parallel alignment between the two members.

In Figs. 6 to 10 there is shown another form of this invention differing from the previous form in that the bumper member 22a is arcuate in shape being smoothly curved backward towards its ends, and also differing in that a single group of spring leaves 24a interconnects members 22a and 23a instead of the pair of groups 24 shown in Fig. 1. A similar pair of coil or spiral springs 25a and 26a mounted around rods 35b interconnects the two members 22a and 23a as described in the previous figures.

Fig. 7 shows a rear view of this article illustrating among other things the size of mounting member 23 and the way it fits substantially within the larger inwardly curved bumper member 22a.

Fig. 8, which is a cross section of the article of Fig. 6 shows the mounting of leaf spring 24a between bumper member 22a and mounting member 23a with spring 25a and rod 35b interconnecting the two members 22a and 23. The structure of the leaf spring 24a is similar to that shown in Fig. 2 comprising a plurality of spring leaves 27 joined together in a group.

As shown in Fig. 9, the spring 24a is secured to the mounting member 23 by means of a bolt 33a while the rod 25a is slidably secured thereto by means of the rod extending through mounting member 23a.

The ends of the spring 24 are secured to the bumper member 22a by means of a loop 30a passing around the pin 31a on the bumper member 22a, the loop being at the end of one spring leaf 27.

Figs. 11 and 12 show another form of the invention, particularly adapted to use on the rear end of a truck, as for example, in accordance with Fig. 11. In this form of the invention, two springs 21a are mounted on the rear of a truck 41 curving somewhat beyond the sides of the truck. As will be shown in connection with Fig. 12 these bumpers are springably mounted on the truck with the outside ends 42 of the bumper less easily compressed than the inside ends 43.

Fig. 12 shows in outline one of spring members 21a adapted to fit on the right end area of the truck. The bumper 21a comprises a bumper member 22b and a mounting member 23b interconnected by means of oppositely arched leaf spring 24b and 27a as in Fig. 1, and by means of a light coil spring 26b at end 43 and a heavy coil spring 25b at the end 42. Through these springs 25b and 26b rods extend in a manner similar to that shown in the previous figures.

Bumper 21a differs from the article shown in Fig. 1 in that it is shorter, thereby being adapted to be mounted at one corner only of the truck, and also in that spring 25b is heavier than spring 26b whereby there is unbalanced resistance to shock. Thus, an object colliding with the two bumper members 21a will be resisted largely by leaf spring 24b and 27a within each bumper; however an object colliding at the corner of the truck will be resisted by leaf springs 24b in the bumper which it strikes and in addition will be strongly resisted by heavy coil springs 25b.

While I have illustrated and described the preferred embodiments of my invention, it is to be understood that I do not limit myself to the precise constructions herein disclosed and the right is reserved to all changes and modifications coming within the scope of the invention as defined in the appended claim.

Having thus described my invention, what I claim as new and desire to secure by United States Letters Patent is:

A bumper comprising an elongated mounting member for attachment on a vehicle, and elongated bumper member extended parallel to said mounting member and spaced therefrom, compressible resilient means supporting said bumper member on said mounting member, and arcuate leaf springs interposed between the adjacent faces of said bumper member and said mounting member and between said resilient supporting means, said leaf springs comprising a pair of oppositely disposed groups of leaf springs having their outer ends connected together and their intermediate portions secured to said bumper member and said mounting member intermediate of their ends, said leaf springs having their lengths disposed parallel to the lengths of said mounting member and said bumper member.

PASQUALE TERRANOVA.

REFERENCES CITED

The following references are of record in the file of this patent:

UNITED STATES PATENTS

| Number | Name | Date |
|--------|------|------|
| 1,424,699 | Wernig | Aug. 1, 1922 |
| 1,504,505 | Reed et al. | Aug. 12, 1924 |
| 1,505,365 | Banschbach | Aug. 19, 1924 |
| 1,513,257 | McGowen | Oct. 28, 1924 |
| 1,581,432 | Fageol | Apr. 20, 1926 |
| 1,593,118 | Earle | July 20, 1926 |
| 1,697,204 | Nomicos | Jan. 1, 1929 |